(12) United States Patent
Young et al.

(10) Patent No.: US 7,829,240 B2
(45) Date of Patent: Nov. 9, 2010

(54) CONICAL SHAPED FUEL STORAGE TANK

(75) Inventors: David A. Young, Huntington Woods, MI (US); James W. Dandalides, Macomb, MI (US)

(73) Assignee: GM Global Technology Operations, Inc., Detroit, MI (US)

(*) Notice: Subject to any disclaimer, the term of this patent is extended or adjusted under 35 U.S.C. 154(b) by 520 days.

(21) Appl. No.: 11/624,748

(22) Filed: Jan. 19, 2007

(65) Prior Publication Data

US 2008/0173283 A1 Jul. 24, 2008

(51) Int. Cl.
*H01M 8/02* (2006.01)
(52) U.S. Cl. .................. 429/515; 429/462; 429/512

(58) Field of Classification Search .................. 429/34
See application file for complete search history.

(56) References Cited

U.S. PATENT DOCUMENTS 6,123,295 A * 9/2000 Wexler et al. ............ 244/172.3
2006/0222918 A1* 10/2006 Koike ........................ 429/24

* cited by examiner

*Primary Examiner*—Dah-Wei D Yuan
*Assistant Examiner*—Jacob Marks
(74) *Attorney, Agent, or Firm*—Fraser Clemens Martin & Miller LLC; J. Douglas Miller

(57) ABSTRACT

A fuel cell powered vehicle is disclosed having a fuel tank, wherein the fuel tank is disposed on an undercarriage of the vehicle and has a substantially conical shape to militate against interference with a function of a suspension system of the vehicle.

15 Claims, 2 Drawing Sheets

CONICAL SHAPED FUEL STORAGE TANK

FIELD OF THE INVENTION

The invention relates to a fuel cell powered vehicle and more particularly to a fuel cell powered vehicle having a fuel storage tank, wherein the fuel tank system is disposed on an undercarriage of the vehicle and has a substantially conical shape.

BACKGROUND OF THE INVENTION

Typical fuel cell powered vehicles use fuel cell power systems that convert a fuel and an oxidant into electricity. One type of fuel cell power system employs use of a proton exchange membrane (hereinafter "PEM") to catalytically facilitate reaction of fuels (such as hydrogen) and oxidants (such as air or oxygen) into electricity. The fuel and oxidant are typically stored in large pressurized fuel tanks and stored on an undercarriage of the vehicle. Due to the large fuel tank size, interior passenger space or cargo space may be reduced to provide enough fuel to meet vehicle performance requirements in the fuel tank.

Typically, fuel tanks are cylindrical in shape, and are disposed transversely on the undercarriage of the vehicle, behind the rear passenger seats and between the rear wheels. Current fuel tanks are manufactured using a filament wound composite method. However, the use of the filament wound composite method restricts the shape of the fuel tank to a simple geometric shape, such as a cylindrical shape, for example.

The large size and shape of the fuel tank often restricts the function of the vehicle suspension system and limits the suspension linkage shape and suspension configuration. On a vehicle using body frame integral (BFI) construction, space for the fuel tank is limited to the space beneath a floorpan of the vehicle and in front of the second row of seats. In a vehicle utilizing a double A-arm type suspension system, the corners of a cylindrical fuel storage tank interfere with the suspension system.

It would be desirable to develop a fuel tank for a fuel cell power system with an improved design adapted to maximize interior passenger space, cargo space, and fuel storage capacity, while minimizing interference with a suspension system of the vehicle.

SUMMARY OF THE INVENTION

Concordant and congruous with the present invention a fuel cell power system with an improved design adapted to maximize interior passenger space, cargo space, and fuel storage capacity, while minimizing interference with a suspension system of the vehicle.

In one embodiment, the fuel tank system comprises at least one fuel tank having an outer wall forming a cavity for housing a compressed fuel, a first portion adjacent a first end having a first volume, and a second portion adjacent a second end having a second volume greater than the volume of the first portion to form a substantially conical shape.

In another embodiment, the fuel tank system comprises at least one fuel tank having an outer wall forming a cavity for housing a compressed fuel, a first portion adjacent a first end having a first width, and a second portion adjacent a second end having a second width greater than the width of the first portion to form a substantially conical shape; and a bulkhead, wherein said bulk head is adapted to militate against movement of said fuel tank.

In another embodiment, the fuel tank system; at least one fuel tank having an outer wall forming a cavity for housing a compressed fuel, a first portion adjacent a first end having a first volume, and a second portion adjacent a second end having a second volume greater than the volume of the first portion to form a substantially conical shape, wherein the first fuel tank is in fluid communication with said fuel cell stack.

DESCRIPTION OF THE DRAWINGS

The above, as well as other advantages of the present invention, will become readily apparent to those skilled in the art from the following detailed description of a preferred embodiment when considered in the light of the accompanying drawings in which.

DESCRIPTION OF THE PREFERRED EMBODIMENT

The following detailed description and appended drawings describe and illustrate various exemplary embodiments of the invention. The description and drawings serve to enable one skilled in the art to make and use the invention, and are not intended to limit the scope of the invention in any manner.

Figure 1:
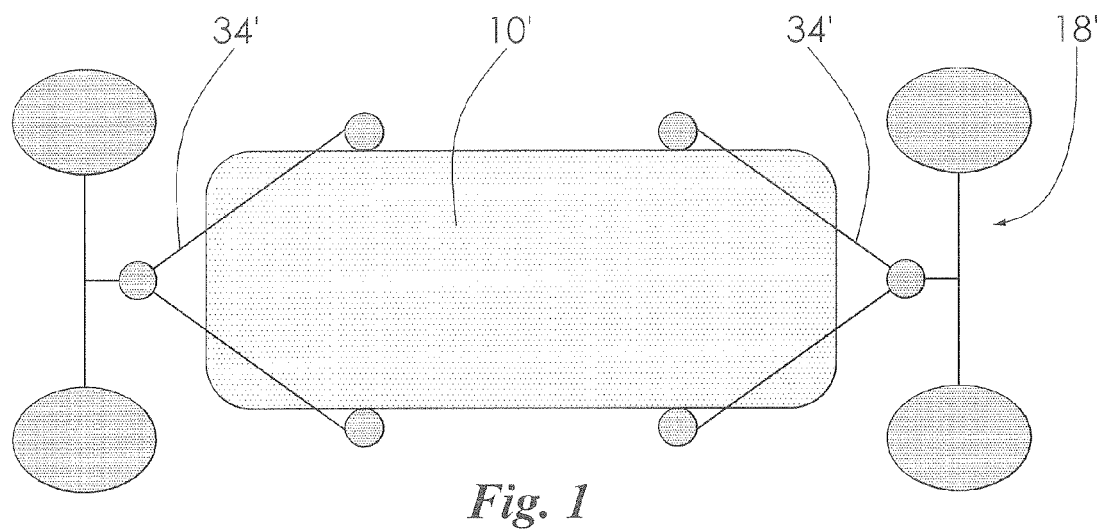
FIG. 1 is a schematic rear view of a vehicle incorporating a suspension system and a fuel tank system as known in the art.

FIG. 1 illustrates a vehicle 18' with a fuel tank system 10' as known in the art. The fuel tank system 10' has a substantially cylindrical shape. As shown, the shape of the fuel tank system 10' causes the system 10' to interfere with a suspension system 34' by limiting the linkage (not shown) shapes of the suspension system 34', the configuration of the suspension system 34', and the movement of the suspension system 34'.

Figure 2:
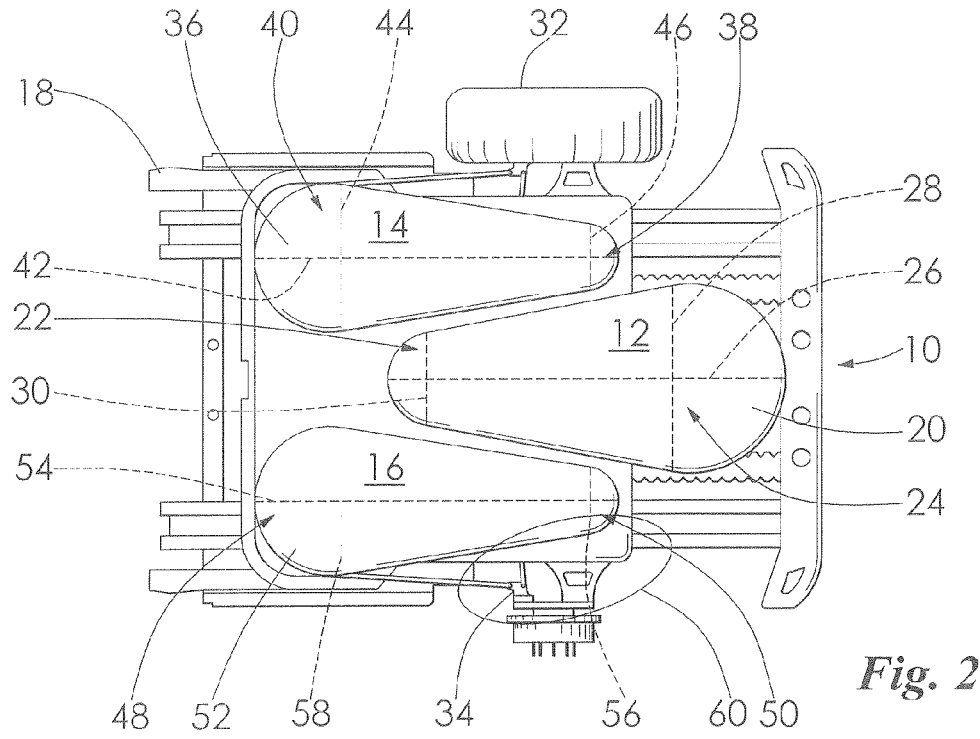
FIG. 2 is a top plan view of a vehicle and suspension system incorporating a fuel tank system according to an embodiment of the invention.
Figure 3:
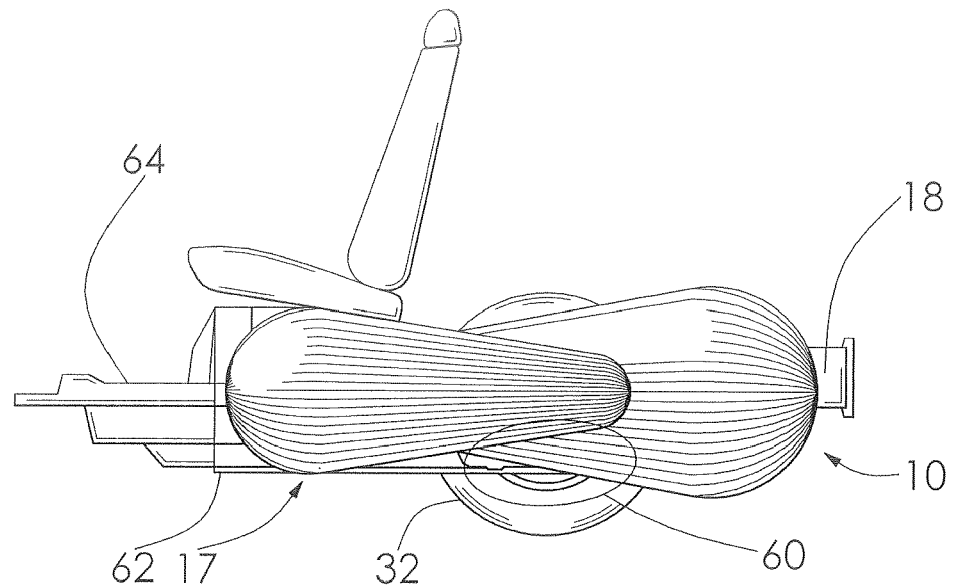
FIG. 3 is a fragmentary side elevational view of the vehicle and suspension system incorporating the fuel tank shown of FIG. 2.

FIG. 2 shows a fuel tank system 10 according to an embodiment of the invention. The fuel tank system 10 includes a first tank 12, a second tank 14, and a third tank 16. The first tank 12, the second tank 14, and the third tank 16 have substantially the same shape and dimensions. It is understood that the first tank 12, the second tank 14, and the third tank 16 may have different shapes and dimensions, as desired. More or fewer tanks can be used as desired. In the embodiment shown, the tanks 12, 14, 16 of the fuel tank system 10 are disposed on an undercarriage 17 of a fuel cell powered vehicle 18, as clearly shown in FIG. 3. It is understood that the fuel tank system 10 may be disposed on any vehicle and on any portion of the vehicle, as desired.

Figure 4:
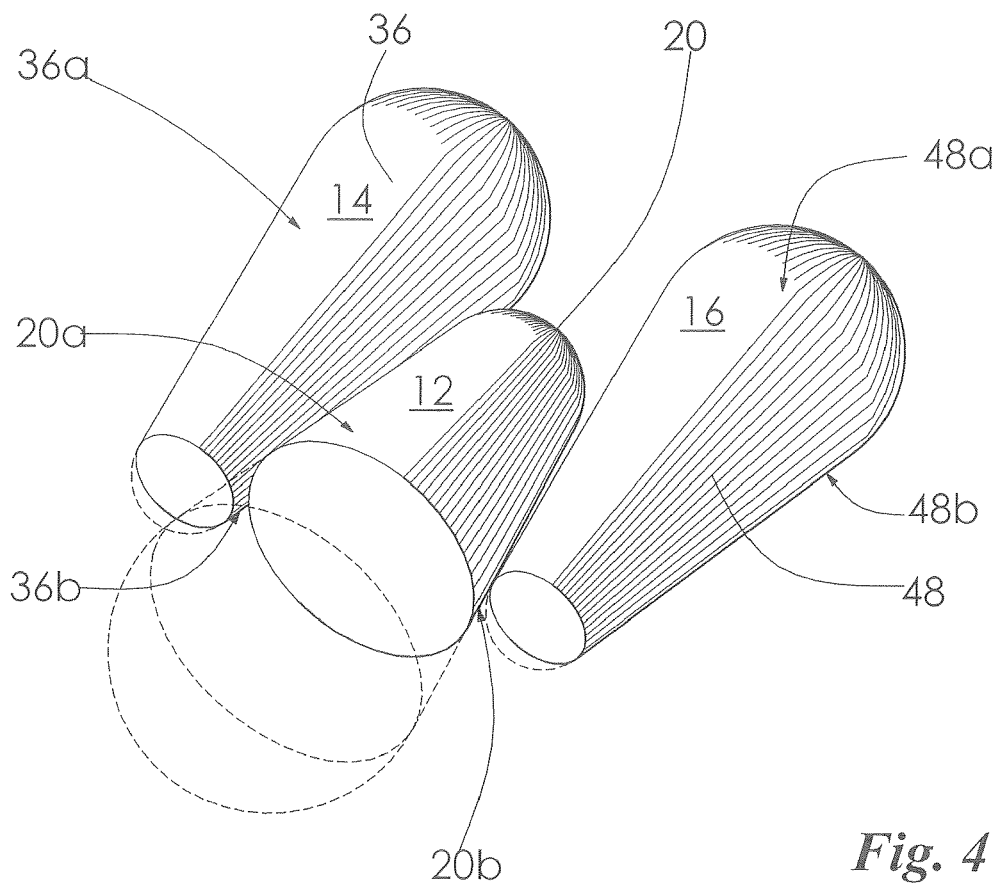
FIG. 4 is a perspective view of the fuel tank system of FIGS. 2 and 3.

The first tank 12 has an outer wall 20, a first portion 22, and a second portion 24. The first tank 12 has a length 26, a first width 28, and a second width 30. A cavity is formed by the outer wall 20 and is adapted to house a fuel (not shown). In the embodiment shown, the length 26 of the outer wall 20 of the first tank 12 is greater than the first width 28 and the second width 30, and the first width 28 is greater than the second width 30. Therefore, the outer wall 20 has a substantially conical shape. It is understood that the outer wall 20 may have any shape with the length 26 greater than the first width 28 and the second width 30, as desired. As shown in FIG. 4, the outer wall 20 has a substantially rounded top 20a and a substantially rounded bottom 20b to form a first tank 12 having a substantially circular cross-sectional shape. It is understood that the top 20a and bottom 20b may have any configuration to form a substantially rectangular cross-sectional shape, a substantially triangular cross-sectional shape, a substantially ovoid cross-sectional shape, and other cross-sectional shape, as desired. It is further understood that the wall 20 may be formed from a material with mechanical properties sufficient to house a compressed fuel. The outer wall 20 may be formed from a metal, a plastic, a composite material, and any other conventional material capable of storing pressurized fluids, as desired. The fuel may be a liquid or a compressed gas, such as hydrogen, for example. The first portion 22 of the first tank 12 is disposed laterally inwardly of the rear tires 32 and intermediate a suspension system 34 of the vehicle 18. As shown in FIG. 2, the suspension system 34 is an independent suspension system. It is understood that the first portion 22 may have any volume, as desired. It is further understood that the suspension system 34 may be any conventional suspension system 34 such as SLA, multi-link and leaf & beam, for example. The second portion 24 of the first tank 12 is disposed on an opposite end of the first tank 12 from the first portion 22. A volume of the second portion 24 is greater than a volume of the first portion 22. It is understood that the second portion 24 may have any volume, as desired.

The second tank 14 has an outer wall 36, a first portion 38, and a second portion 40. The second tank 14 has a length 42, a first width 44, and a second width 46. A cavity is formed by the outer wall 36 and is adapted to house a fuel (not shown). The second tank 14 is in fluid communication with the first tank 12. In the embodiment shown, the length 42 of the outer wall 36 of the second tank 14 is greater than the first width 44 and the second width 46, and the first width 44 is greater than the second width 46. Therefore, the outer wall 36 has a substantially conical shape. As shown in FIG. 4, the outer wall 36 has a substantially rounded top 36a and a substantially rounded bottom 36b to form a second tank 14 having a substantially circular cross-sectional shape. It is understood that the top 36a and bottom 36b may have any configuration to form a substantially rectangular cross-sectional shape, a substantially triangular cross-sectional shape, a substantially ovoid cross-sectional shape, and other cross-sectional shape, as desired. It is understood that the outer wall 36 may have any shape with the length 42 greater than the first width 44 and the second width 46, as desired. It is further understood that the outer wall 36 may be formed from a material with mechanical properties sufficient to house a compressed fuel. The outer wall 36 may be formed from a metal, a plastic, a composite material, and any other conventional material capable of storing pressurized fluids, as desired. The fuel may be a liquid or a compressed gas, such as hydrogen, for example. The first portion 38 is disposed adjacent the first portion 22 of the first tank 12, adjacent a tire of the rear tires 32, and intermediate the suspension system 34 of the vehicle 18. It is understood that the first portion 38 may have any volume, as desired. The second portion 40 of the second tank 14 is disposed on an opposite end of the second tank 14 from the first portion 38. The second portion 40 is disposed on the undercarriage 17 away from the rear tires 32. A volume of the second portion 40 is greater than a volume of the first portion 38. It is understood that the second portion 40 may have any volume, as desired.

The third tank 16 has an outer wall 48, a first portion 50, and a second portion 52. The third tank 16 has a length 54, a first width 56, and a second width 58. A cavity is formed by the outer wall 48 and is adapted to house a fuel (not shown). The third tank 16 is in fluid communication with the first tank 12. In the embodiment shown the length 54 of the outer wall 48 of the third tank 16 is greater than the first width 56 and the second width 58, and the first width 56 is greater than the second width 58. Therefore, the outer wall 48 has a substantially conical shape. As shown in FIG. 4, the outer wall 48 has a substantially rounded top 48a and a substantially rounded bottom 48b to form a third tank 16 having a substantially circular cross-sectional shape. It is understood that the top 48a and bottom 48b may have any configuration to form a substantially rectangular cross-sectional shape, a substantially triangular cross-sectional shape, a substantially ovoid cross-sectional shape, and other cross-sectional shape, as desired. It is understood that the outer wall 48 may have any shape with the length 54 greater than the first width 56 and the second width 58, as desired. It is further understood that the outer wall 48 may be formed from a material with mechanical properties sufficient to house a compressed fuel. The outer wall 48 may be formed from a metal, a plastic, a composite material, and any other conventional material capable of storing pressurized fluids, as desired. The fuel may be a liquid or a compressed gas, such as hydrogen, for example. The first portion 50 of the third tank 16 is disposed adjacent the first portion 22 of the first tank 12, adjacent a second tire of the rear tires 32, and intermediate the suspension system 34 of the vehicle 18. It is understood that the first portion 50 may have any volume, as desired. The second portion 52 of the third tank 16 is disposed on an opposite end of the third tank 16 from the first portion 50. The second portion 52 is disposed on the undercarriage 17 away from the rear tires 32. A volume of the second portion 52 is less than a volume of the first portion 50. It is understood that the second portion 52 may have any volume, as desired.

In use, the first tank 12 of the fuel tank system 10 is in fluid communication with a fuel cell power assembly (not shown). The second tank 14 and the third tank 16 are in fluid communication with the first tank 12. It is understood that the second tank 14 or the third tank 16 may be in fluid communication with the fuel cell power assembly, as desired. When the vehicle 18 is in operation, the fuel tank system 10 provides a feed of fuel such as hydrogen to the anode side of the fuel cell assembly.

During use of the vehicle 18, interference with the performance of the suspension system 34 by the fuel tank system 10 is minimized due to the substantially conical shape of the tanks 12, 14, 16. As shown in FIG. 2, the tanks 12, 14, 16 are alternatingly disposed on the undercarriage 17 intermediate the suspension system 34 with the second tank 14 inverted with respect to the first tank 12 and the third tank 16. The respective first portions 22, 38, 50 of the tanks 12, 14, 16 substantially adjacent one another. The offset alignment of the tanks 12, 14, 16 maximizes the volume of the fuel tank system 10 while minimizing the interference with the suspension system 34 by providing a space 60 adjacent each of the rear tires 32. The space 60 accommodates the suspension system 34 components and movement. A further advantage of providing a fuel tank system 10 that does not interfere with the suspension system 34 is that the interior and cargo space of the vehicle 18 removed to provide for the suspension system 34 and fuel tank system 10 is minimized, thereby optimizing the utility and comfort of the vehicle 18.

A bulkhead 62 disposed between the rear tires 32 and behind a rear passenger foot well 64 is adapted to militate against the forward movement of the tanks 12, 14, 16 past the foot well 64 in the event of a rear impact event. It is understood that the bulkhead 62 may be adapted to receive the tanks 12, 14, 16.

From the foregoing description, one ordinarily skilled in the art can easily ascertain the essential characteristics of this invention and, without departing from the spirit and scope thereof, can make various changes and modifications to the invention to adapt it to various usages and conditions.

What is claimed is:

1. A fuel tank system for a vehicle comprising:
   a first fuel tank having an outer wall forming a cavity for housing a compressed fuel, a first portion adjacent a first end having a first volume, and a second portion adjacent a second end having a second volume greater than the volume of the first portion to form a substantially conical shape;
   a second fuel tank having an outer wall forming a cavity for housing a compressed fuel, a first portion adjacent a first end having a first volume, and a second portion adjacent a second end having a second volume greater than the volume of the first portion to form a substantially conical shape, wherein said second fuel tank is inverted with respect to said first fuel tank, the respective first portions of said first fuel tank and said second fuel tank substantially adjacent one another, and the second portion of said first fuel tank is positioned laterally away from the second portion of said second fuel tank; and a vehicle suspension system, wherein said first fuel tank and said second fuel tank are disposed intermediate said vehicle suspension system.

2. The fuel tank system for a vehicle of claim 1, further comprising a third fuel tank having an outer wall forming a cavity for housing a compressed fuel, a first portion adjacent a first end having a first volume, and a second portion adjacent a second end having a second volume greater than the volume of the first portion to form a substantially conical shape, wherein said first fuel tank, said second fuel tank, and said third fuel tank are alternatingly disposed with said second fuel tank and said third fuel tank offset from said first fuel tank and the respective first portions of said first fuel tank, said second fuel tank, and said third fuel tank substantially adjacent one another and the respective second portions of said second fuel tank and said third fuel tank are laterally away from the second portion of said first fuel tank.

3. The fuel tank system for a vehicle of claim 1, wherein the compressed fuel is a liquid.

4. The fuel tank system for a vehicle of claim 1, wherein the compressed fuel is a compressed gas.

5. The fuel tank system for a vehicle of claim 1, wherein the compressed fuel is hydrogen.

6. The fuel tank system for a vehicle of claim 1, wherein the outer walls are formed from one of a plastic, a composite material, and a metal.

7. The fuel tank system for a vehicle of claim 1, further including a bulkhead adapted to militate against the forward movement of said first fuel tank and said second fuel tank.

8. A fuel tank system for a vehicle comprising:
a first fuel tank having an outer wall forming a cavity for housing a compressed fuel, a first portion adjacent a first end having a first volume, and a second portion adjacent a second end having a second volume greater than the volume of the first portion to form a substantially conical shape;
a second fuel tank having an outer wall forming a cavity for housing a compressed fuel, a first portion adjacent a first end having a first volume, and a second portion adjacent a second end having a second volume greater than the volume of the first portion to form a substantially conical shape, wherein said second fuel tank is inverted with respect to said first fuel tank, the respective first portions of said first fuel tank and said second fuel tank substantially adjacent one another, and the second portion of said first fuel tank is positioned laterally away from the second portion of said second fuel tank;
a bulkhead adapted to militate against the forward movement of said first fuel tank and said second fuel tank; and
a vehicle suspension system, wherein said first fuel tank and said second fuel tank are disposed intermediate said vehicle suspension system.

9. The fuel tank system for a vehicle of claim 8, wherein the compressed fuel is one of a compressed liquid and a compressed gas.

10. The fuel tank system for a vehicle of claim 8, wherein the compressed fuel is compressed hydrogen.

11. The fuel tank system for a vehicle of claim 8, further comprising a third fuel tank having an outer wall forming a cavity for housing a compressed fuel, a first portion adjacent a first end having a first volume, and a second portion adjacent a second end having a second volume greater than the volume of the first portion to form a substantially conical shape, wherein said first fuel tank, said second fuel tank, and said third fuel tank are alternatingly disposed with said second fuel tank and said third fuel tank offset from said first fuel tank and the respective first portions of said first fuel tank, said second fuel tank, and said third fuel tank substantially adjacent one another and the respective second portions of said second fuel tank and said third fuel tank are laterally away from the second portion of said first fuel tank.

12. The fuel tank system for a vehicle of claim 11, wherein said first fuel tank is disposed between said second fuel tank and said third fuel tank and such that the first portion of said first fuel tank is positioned between the first portion of said second fuel tank and the first portion of said third fuel tank and the second portion of said first fuel tank is positioned laterally away from the second portion of said second fuel tank and said third fuel tank.

13. A fuel cell propulsion system for a vehicle comprising:
a fuel cell system including a plurality of fuel cell plates;
a first fuel tank having an outer wall forming a cavity for housing a compressed fuel, a first portion adjacent a first end having a first volume, and a second portion adjacent a second end having a second volume greater than the volume of the first portion to form a substantially conical shape;
a second fuel tank having an outer wall forming a cavity for housing a compressed fuel, a first portion adjacent a first end having a first volume, and a second portion adjacent a second end having a second volume greater than the volume of the first portion to form a substantially conical shape, wherein said second fuel tank is inverted with respect to said first fuel tank, the respective first portions of said first fuel tank and said second fuel tank substantially adjacent one another, and the second portion of said first fuel tank is positioned laterally away from the second portion of said second fuel tank;
a third fuel tank having an outer wall forming a cavity for housing a compressed fuel, a first portion adjacent a first end having a first volume, and a second portion adjacent a second end having a second volume greater than the volume of the first portion to form a substantially conical shape, wherein said second fuel tank is inverted with respect to said first fuel tank and said third fuel tank, the respective first portions of said first fuel tank, said second fuel tank, and said third fuel tank substantially adjacent one another and the respective second portions of said second fuel tank and said third fuel tank are laterally away from the second portion of said first fuel tank; and
a vehicle suspension system, wherein said first fuel tank, said second fuel tank, and said third fuel tank are disposed intermediate said vehicle suspension system.

14. The fuel cell propulsion system for a vehicle of claim 13, wherein the compressed fuel is one of a compressed liquid and a compressed gas.

15. The fuel cell propulsion system for a vehicle of claim 13, further including a bulkhead adapted to militate against the forward movement of said first fuel tank, said second fuel tank, and said third fuel tank.

* * * * *